United States Patent
Koziel

(10) Patent No.: US 11,032,074 B2
(45) Date of Patent: Jun. 8, 2021

(54) CRYPTOSYSTEM AND METHOD USING ISOGENY-BASED COMPUTATIONS TO REDUCE A MEMORY FOOTPRINT

(71) Applicant: PQSecure Technologies, LLC, Boca Raton, FL (US)

(72) Inventor: Brian Craig Koziel, Plano, TX (US)

(73) Assignee: PQSecure Technologies, LLC, Boca Raton, FL (US)

( * ) Notice: Subject to any disclaimer, the term of this patent is extended or adjusted under 35 U.S.C. 154(b) by 353 days.

(21) Appl. No.: 16/272,983

(22) Filed: Feb. 11, 2019

(65) Prior Publication Data

US 2020/0259648 A1 Aug. 13, 2020

(51) Int. Cl.
*H04L 9/30* (2006.01)
*H04L 9/06* (2006.01)
*G06F 7/72* (2006.01)

(52) U.S. Cl.
CPC ............ *H04L 9/3066* (2013.01); *G06F 7/725* (2013.01); *H04L 9/0631* (2013.01);
(Continued)

(58) Field of Classification Search
CPC ... H04L 9/3066; H04L 9/0637; H04L 9/0631; H04L 2209/30; H04L 2209/38; G06F 7/725
See application file for complete search history.

(56) References Cited

U.S. PATENT DOCUMENTS 10,218,494 B1 * 2/2019 de Quehen ........... H04L 9/3247
2005/0094806 A1 * 5/2005 Jao ........................ G06F 7/725
380/30
(Continued)

OTHER PUBLICATIONS

Koziel et al. Post-Quantum Cryptography on FPGA Based on Isogenies on Elliptic Curves IEEE Transactions on Circuits and Systems—I: Regular Papers, vol. 64, No. 1, Jan. 2017 (Year: 2017).*
(Continued)

*Primary Examiner* — David J Pearson
(74) *Attorney, Agent, or Firm* — Mark C. Johnson; Johnson Dalal

(57) ABSTRACT

A computer processing system and method for reducing memory footprint that includes initiating, through at least one computer processor, a cryptography session utilizing an i-degree isogeny arithmetic computation having chained computations therein. The cryptography session includes implementing a first iteration cycle, of a plurality of iteration cycles, and a implementing a remaining amount of the plurality of iteration cycles, each of the plurality iteration cycles computing $\ell$ isogenies using a compressed Z value to complete the $\ell$-degree isogeny arithmetic computation. The first iteration cycle includes individually computing a plurality of sequentially occurring pivot points within the chained computations, implementing a Co—Z algorithm within the plurality of sequentially occurring pivot points to compute and store the compressed Z value on one of the plurality of temporary registers and computing a first $\ell$ isogeny of the $\ell$-degree isogeny arithmetic computations using the compressed Z value.

16 Claims, 4 Drawing Sheets

(52) U.S. Cl.
CPC ........ *H04L 9/0637* (2013.01); *H04L 2209/30* (2013.01); *H04L 2209/38* (2013.01)

(56) References Cited

U.S. PATENT DOCUMENTS

| | | | |
|---|---|---|---|
| 2017/0243176 A1* | 8/2017 | Hanke | G06Q 20/0655 |
| 2019/0004770 A1* | 1/2019 | Satpathy | G06F 7/725 |
| 2019/0158284 A1* | 5/2019 | F. Aranha | H04L 63/0428 |
| 2020/0014534 A1* | 1/2020 | Garcia Morchon | H04L 9/3073 |

OTHER PUBLICATIONS

Koziel et al. A High-Performance and Scalable Hardware Architecture for Isogeny-Based Cryptography IEEE Transactions on Computers, vol. 67, No. 11, Nov. 2018 (Year: 2018).*

Faz-Hernandez et al. A Faster Software Implementation of the Supersingular Isogeny Diffie-Hellman IEEE Transactions on Computers, vol. 67, No. 11, Nov. 2018 (Year: 2018).*

* cited by examiner

CRYPTOSYSTEM AND METHOD USING ISOGENY-BASED COMPUTATIONS TO REDUCE A MEMORY FOOTPRINT

FIELD OF THE INVENTION

The present invention relates generally to systems and methods directed toward cryptosystems, and, more particularly, relates to isogeny-based cryptosystems.

BACKGROUND OF THE INVENTION

Cryptology is the practice and study of techniques for secure communication in the presence of third parties called adversaries. More generally, cryptography is about constructing and analyzing protocols that prevent third parties or the public from reading private messages and includes various aspects in information security such as data confidentiality, data integrity, authentication, and non-repudiation. Applications of cryptography include electronic commerce, chip-based payment cards, digital currencies, computer passwords, and military communications. Cryptosystems are a suite of cryptographic algorithms needed to implement a particular security service, most commonly for achieving confidentiality. Due to the typical amount and time of computations required for a cryptography session, namely one utilizing cryptography, the hardware or processing footprint is quite expansive. As such, utilizing such methods and systems is made impossible or commercially impracticable when desired for use in smaller devices, such as IoT devices. Moreover, those known cryptosystems that are relatively small in spatial or memory footprint, achieve said small footprint at the expense of the processing speed associated with performing the computations associated therewith.

Therefore, those known systems and methods fail to address small implementations of cryptosystems or have a small cryptosystem that computes at low speeds. As these cryptosystems have only just been gaining popularity and acceptance in the cryptographic community, implementations of arithmetic computations for cryptosystems have also made its deployment problematic. The primary deficiency with isogeny-based cryptosystems has been its efficiency. As such, much of the research community has focused on making high-speed implementations. More specifically, the deployment of post-quantum cryptosystems have been difficult, as there are many tradeoffs in key size, memory requirements, and performance. the primary deficiency with quantum resistant isogeny-based cryptosystems has typically been their efficiency. As such, much of the research community has focused on making high-speed implementations. These efforts, however, have resulted in the creation of systems generating large processing footprints that are often spatially inefficient. Therefore, there are limited lightweight implementations of cryptosystems.

There are multiple known naive methods to perform large-degree isogeny (i.e., chained isogenies) computations. The slow method is to iteratively compute isogenies while storing only a single temporary Montgomery elliptic curve point, requiring two registers to store the point's X and Z values. The fastest known naive method is to store critical "pivot" points throughout this computation to avoid computing unnecessary information, which has been shown to be more than ten times faster than the slow method in some implementations at the cost of perhaps 5 to 10 temporary points that must be stored.

Furthermore, in researching those known cryptosystems, it was noticed that hardware implementations of isogeny-based cryptography generally required many registers to perform all computations, thereby dominating the total square area of the processing chip on the cryptosystem. In these protocols, the large-degree isogeny was the bottleneck as it required many registers to be efficiently computed.

Therefore, a need exists to overcome the problems with the prior art as discussed above.

SUMMARY OF THE INVENTION

The invention provides a cryptosystem and method using isogeny-based computations to reduce a spatial area footprint that overcomes the hereinbefore-mentioned disadvantages of the heretofore-known devices and methods of this general type and that is operably configured to efficiently perform isogenies with high speed and a small memory footprint. Normally, implementations must choose between high speed or low memory consumption, but the cryptosystem of the present invention utilizes an implementation method involving a specialized "Co—Z algorithm" that achieves both. For instance, the system, method, and device of the present invention employs the most known memory-efficient method for large-degree isogeny to use two temporary registers. One known "optimal speed" algorithm is significantly fast at processing, but utilizes twelve temporary registers. Comparatively, the present invention, which utilizes the Co—Z algorithm to facilitate in data compression, retains this same known significantly fast processing, but utilizes only seven temporary registers, or 42% fewer registers. Considering that a register in our implemented scheme was 1,006 bits, this saves more than 5,000 flip-flops in the present invention's hardware implementation and 160 words in our software's stack. Said differently, there are no known lightweight implementations of isogeny-based cryptography. The closest known technology is the memory-light, but extremely slow approach to isogeny computations. The present invention alters this algorithm when applied to software or hardware implementations to minimize the register overhead.

With the foregoing and other objects in view, there is provided, in accordance with the invention, a computer-implemented cryptography method using isogeny-based computations for reducing a memory footprint wherein said method includes the steps of providing at least one computer processor resident on an electronic computer device and having at least one register file with a plurality of temporary registers resident thereon and initiating, through the least one computer processor, a cryptography session utilizing an $\ell$-degree isogeny arithmetic computation having chained computations therein. The cryptography session includes implementing a first iteration cycle, of a plurality of iteration cycles, and includes implementing a remaining amount of the plurality of iteration cycles, wherein each of the plurality iteration cycles computing $\ell$ isogenies using the compressed Z value to complete the $\ell$-degree isogeny arithmetic computation. The first iteration cycle may include individually computing a plurality of sequentially occurring pivot points within the chained computations, implementing a Co—Z algorithm within the plurality of sequentially occurring pivot points to compute a compressed Z value, storing the compressed Z value generated from the Co—Z algorithm on one of the plurality of temporary registers, and computing a first isogeny of the $\ell$-degree isogeny arithmetic computations using the compressed Z value.

In accordance with another feature, an embodiment of the present invention includes the first iteration cycle implementing the Co—Z algorithm alternatively within the plurality of sequentially occurring pivot points to compute the compressed Z value. The first iteration cycle may also include exclusively storing the compressed Z value generated from the Co—Z algorithm on the one of the plurality of temporary registers throughout the plurality of the iteration cycles. The first iteration cycle may also include utilizing a single compressed Z value generated by the Co—Z algorithm and stored by the one of the plurality of temporary registers, wherein the Z value is updated sequentially after individually computing a plurality of sequentially occurring pivot points within the chained computations.

In accordance with a further feature of the present invention, the $\ell$-degree isogeny arithmetic computation is carried out with a multiplication-based complexity of O(e log e).

In accordance with yet another feature, an embodiment of the present invention also includes updating the compressed Z value generated by the Co—Z algorithm for each of the plurality of sequentially occurring pivot points after computing the first $\ell$ isogeny of the i-degree isogeny arithmetic computations.

In accordance with a further feature of the present invention, the Z value is updated after computing a first $\ell$ isogeny of the $\ell$-degree isogeny arithmetic computations.

In accordance with another embodiment, the present invention may also be described as a computer processing cryptosystem using isogeny-based computations to reduce a memory footprint, wherein the system includes at least one computer processor resident on an electronic computer device and having a register file with at least two temporary registers resident therein, wherein the at least one computer processor operably configured to implement an $\ell$-degree isogeny arithmetic computation, utilizing a Co—Z algorithm, and having chained computations that include a plurality of sequentially occurring pivot points. The plurality of sequentially occurring pivot points include the at least one computer processor operably configured to implement the Co—Z algorithm to perform a computation generating a compressed Z value that is operably configured to be stored within one of the at least two temporary registers for computing within the plurality of sequentially occurring pivot points to generate a $\ell$-degree isogeny arithmetic computation isogeny computation output.

In accordance with a further feature of the present invention, the at least one computer processor is operably configured to implement the Co—Z algorithm over a first iteration cycle of a plurality of iteration cycles, the first iteration cycle including the processor operably configured to compute a first $\ell$ isogeny of the $\ell$-degree isogeny arithmetic computations using the compressed Z value.

In accordance with yet another feature of the present invention, the at least one computer processor is operably configured, after first iteration cycle, to implement a remaining amount of the plurality of iteration cycles, each of the plurality iteration cycles configured to compute another $\ell$ isogeny.

Although the invention is illustrated and described herein as embodied in a cryptosystem and method using isogeny-based computations to reduce a spatial area footprint, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
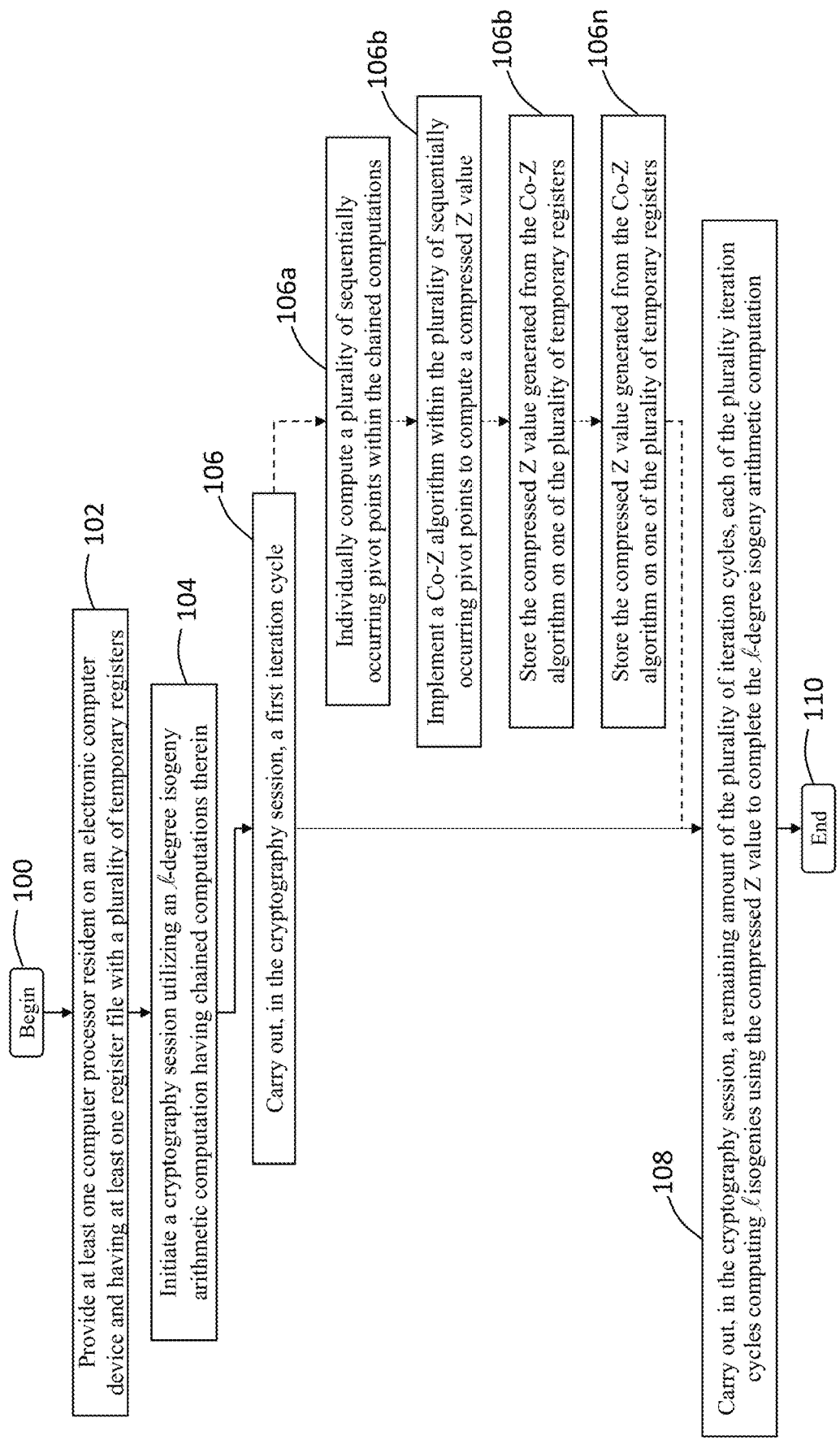
FIG. 1 is a process flow diagram depicting a method of using isogeny-based computations to reduce a memory footprint in a processing cryptosystem in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient computer processing cryptosystem using isogeny-based computations to reduce a memory footprint. More specifically, the system and method is directed toward a cryptosystem that utilizes a Co—Z isogeny-based algorithm and computations to compress the required storage necessary for efficiently computing large-degree isogeny computations. This approach is slightly slower than the optimal speed method, but requires roughly half the amount of memory. One goal of the present invention is to achieve performance, yet reserve the memory footprint, when utilizing these large-scale computations in isogeny-based cryptosystems.

Figure 2:
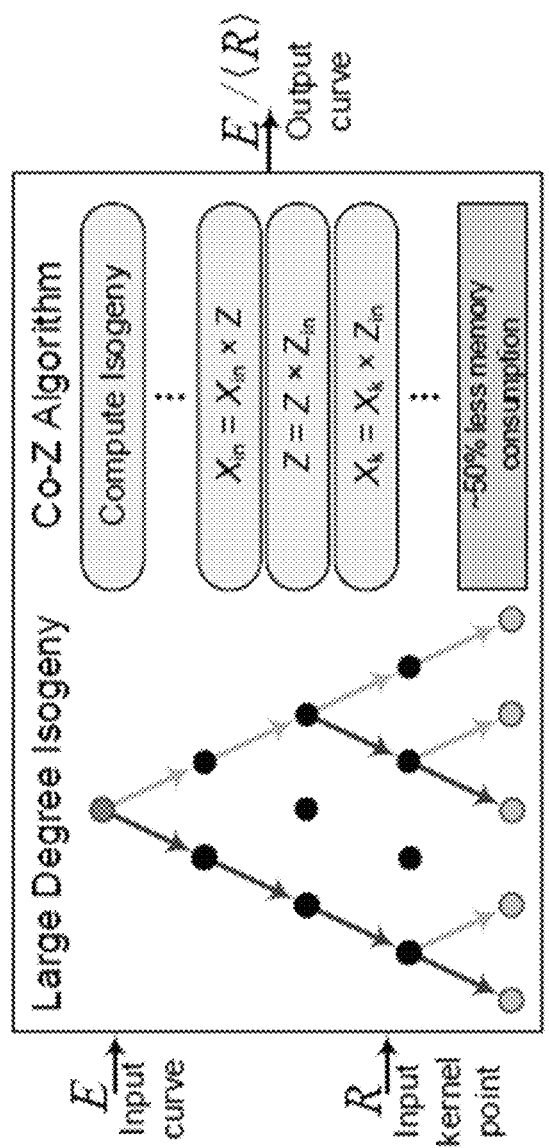
FIG. 2 is a schematic diagram depicting a large degree isogeny employing the use of the Co—Z algorithm in accordance with an embodiment of the present invention.
Figure 3:
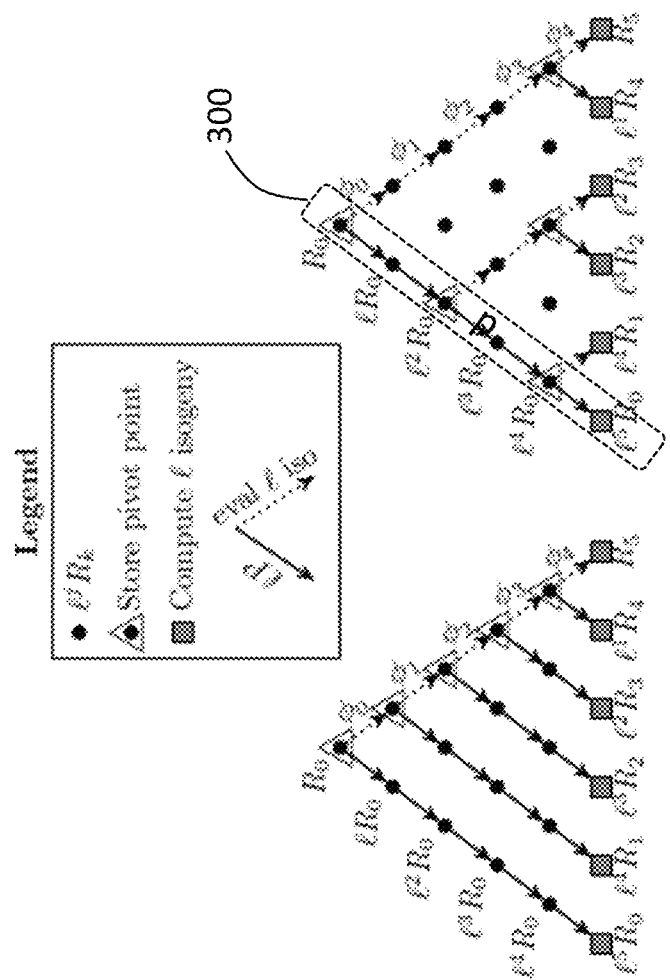
FIG. 3 is a large-degree isogeny computation graph of $\ell^6$ in accordance with an embodiment of the present invention.

More specifically, as shown in FIGS. 1-3, the present invention enables isogeny-based arithmetic to be performed in hardware and software implementations very quickly, yet significantly reduces the number of temporary registers needed to hold intermediate values in isogeny-based arithmetic computations. As such, the present invention enables low-power and energy-efficient implementations of isogeny-based cryptography to be achieved, which is significantly beneficial when applied to the Internet of Things (IoT) industry and devices.

FIGS. 2 and 3 will be described in conjunction with the process flow chart of FIG. 1. Although FIG. 1 shows a specific order of executing the process steps, the order of executing the steps may be changed relative to the order shown in certain embodiments. Also, two or more blocks shown in succession may be executed concurrently or with partial concurrence in some embodiments. Certain steps may be omitted in FIG. 1 for the sake of brevity. In some embodiments, some or all of the process steps included in FIG. 1 can be combined into a single process. FIG. 2 depicts a schematic diagram showing a large-degree isogeny employing the use of the Co—Z algorithm in accordance with an embodiment of the present invention. While the figures depicted herein show several advantageous features of the present invention, as will be described below, the invention can be implemented in other ways and by utilizing other components and functionality.

As discussed above, the fastest known naive method is to store critical "pivot" points throughout the isogeny-based computation to avoid computing unnecessary information. This pivoting system is represented in FIGS. 2 and 3. However, the Co—Z algorithm carries out a compression of the Z coordinates of many points within the pivoting system into a single Z coordinate. Therefore, the Co—Z algorithm can use the fast-naive method with approximately half the memory overhead, thereby greatly aiding low-memory hardware and software implementations that seek to implement isogeny-based computations.

An elliptic curve defined over a finite field, $F_q$, can be written in its short Weierstrass form as: $E_{(a,b)}/F_q : y^2 = x^3 + ax + b$, where $a, b \in F_q$. An elliptic curve is composed of all points $(x,y)$ that satisfy the above equation as well as the point at infinity. This forms an abelian group over point addition, the underlying basis of the scalar point multiplication in elliptic curve Diffie-Hellman, $Q=kP$, where $P, Q \in E$ and k is a scalar. By using abstract geometry to define point addition and doubling formulas, those of skill in the art will appreciate that a scalar point multiplication can be efficiently performed by performing a series of point doublings and additions. However, instead of performing affine point addition and affine point doubling for a scalar point multiplication, we define projective formulas over projective coordinates $(X:Y:Z)$ such that $x=X/Z$ and $y=Y/Z$. With this representation, only a single inversion is performed at the end of the scalar point multiplication.

Furthermore, an isogeny is defined over a finite field, $F_q$, $\varphi: E \rightarrow E'$ as a non-constant rational map defined over $F_q$ such that $\varphi$ satisfies group homomorphism from $E(F_q)$ to $E'(F_q)$. An isogeny can be thought of as a mapping from one elliptic curve class to another that preserves the point at infinity. Two curves are isogenous if an isogeny exists between them. Specifically, for two elliptic curves to be isogenous over a finite field, they must have the same number of points. The degree of an isogeny is its degree as a rational map. For every prime, $\ell \neq p$, there exist $\ell + 1$ isogenies of degree $\ell$ from a specific isomorphism class. Unique isogenies can be computed over a kernel, $\kappa$, such that $\varphi: E \rightarrow E/\langle \kappa \rangle$ by using Vélu's formulas.

With reference to FIG. 3, a large-degree isogeny computation graph of $\ell^6$ is depicted. In particular, the left side of the graph depicts a multiplication-based strategy with complexity $O(e^2)$ and the right side of the graph depicts an optimal strategy with complexity $O(e \log e)$ where the cost of a point multiplication by $\ell$ is 1.5 times as expensive as an isogeny evaluation (1.5:1). Large-degree isogenies can be broken into a chain of smaller degree isogeny computations that are computed iteratively. From a base curve $E_0$ and kernel point $R_0 = R$ of order $\ell^e$, a chain of $\ell$-degree isogenies can be computed as follows:

$$E_{i+1} = E_i / \langle \ell^{e-i-1} R_1 \rangle, \varphi_i : E_i \rightarrow E_{i+1}, R = \varphi_i(R_i).$$

A problem with said computation, however, can be visualized as an acyclic graph, shown on the left side in FIG. 3. The naive (but memory-efficient) approach is on the left with quadratic time complexity. This method would only use two temporary registers in this example (point $R_k$). By utilizing the relative cost to traverse the graph, an optimal strategy of traversal can be computed, with time complexity O(e log e). This faster method would then use 6 temporary registers (points $R_0$, $\ell^2 R_0$, and $\ell^4 R_0$ as we traverse the left side of the pyramid).

To further elaborate on these costs, it may be emphasized within an elliptic curve, having elliptic curve points represented with an X and a Z coordinate in the "Montgomery Kummer" coordinates form. Each coordinate requires $2F_q$ elements to be stored. The naive approach on the left in FIG. 3 requires only a single temporary point which is 2 temporary registers. The process would be carried out as follows:
1. Start at the top of the pyramid with $R_0$
2. Store $R_0$ as a temporary point
3. Compute $\ell^5 R_0$ with algebraic geometry (point arithmetic)
4. Perform an $\ell$-isogeny with $\ell^5 R_0$ as the kernel (more point arithmetic)
5. Push the temporary point $R_0$ through the isogeny to obtain $R_1$ The computation is iteratively performed with $R_0$, then $R_1$, all the way to $R_5$, wherein each step only needs to store one temporary point.

The optimal performance strategy on the right in FIG. 3, however, is different, in that multiple pivot points are stored along the way. The process would be carried out as follows:
1. Start at the top of the pyramid with $R_0$
2. Store $R_0$ as a temporary point
3. Compute $\ell^5 R_0$ with algebraic geometry (point arithmetic) while also storing temporary pivot points $\ell^2 R_0$ and $\ell^4 R_0$ for efficiency
4. Perform an $\ell$-isogeny with $\ell^5 R_0$ as the kernel (more point arithmetic)
5. Push the all temporary points $R_0$, $\ell^2 R_0$, and $\ell^4 R_0$ through the isogeny to obtain $R_1$, $\ell^2 R_1$, and $\ell^4 R_i$, respectively.

The optimal strategy is much more efficient, but requires a lot more storage. For higher key sizes, the depth of the isogeny computation graph is deeper, resulting in the need to store more temporary points for efficient computations.

In Algorithm 1, below, additional steps to implement these formulas in the present invention, and on hardware and software devices, are depicted.

Algorithm 1 Computing a large degree isogeny using a strategy with Co—Z arithmetic. Our patent applications applies the boxed lines to greatly reduce the memory footprint, of this computation.
Input: Isogeny degree e in $\ell^e$,
A lookup table of size e with
the optimal strategy for S,
Kernel point $(X_0, Z_0)$,
Montgomery carve: $A_0 y^2 = x^3 + B_0 x^2 + x$,
Stack structure composed of $(X_i, s_i)$
Output: Isogenous curve $A_e y^2 = x^3 + B_e x^2 + x$
1. pt_stack=[ ]. $X_R = X_0$, $Z = Z_0$
2. for j=1 to e do
3. while i≤e−j do
4. for P at index k in pt_stack do
5. $X_k = X_k \times Z_{tmp}$
6. $Z = Z \times Z_{tmp}$
7. end for
8. Push $(X_R, s_i)$ to the top of the pt_stack
9. index S[e−1−j+1]
10. $(X_R, Z_{tmp}) = \ell \times index \times (X_R, Z)$,
11. i=i+index
12. end while
13. $A_j$, $B_j$=gel_$\ell$_isogeny $(Z_k, Z)$
14. $Z_{new} = 1$
15. for X at index k in pt_stack do
16. $X_k, Z_{tmp2}$=eval_$\ell$_isogeny $(X_k, Z)$
17. $X_k = X_k \times Z_{new}$
18. for X at index s<kin pt_stack do
19. $X_s = X_s \times Z_{tmp2}$)
20. end for
21. $Z_{new} = Z_{new} \times Z_{tmp2}$
22. end for
23. Pop top element $(X, i_s)$ from pt_stack
24. $X_R = X$, $Z = Z_{new}$, $i = i_s$
25. end for
26. return $A_e y^2 = x^3 + B_e x^2 + x$ The above-referenced algorithm exemplifies and represents the computing of a large degree isogeny using the Co—Z arithmetic algorithm. The portion of the above-referenced algorithm depicted with rectangles in lines 4-7 of the above code represents the computations carried out in each of the triangles (i.e., $R_0$, $I^2 R_0$, etc.) shown in the right of FIG. 3, wherein the triangles represent where pivot points are stored. The portion of the above-referenced algorithm depicted with rectangles in lines 17-21 of the above code represents the computations carried out in each of the squares (i.e., $I^5 R_0$, $I^4 R_1$, etc.) shown in the right of FIG. 3, wherein the triangles represent where pivot points are stored. As such, the above-referenced algorithm applies the rectangular boxed lines of code to greatly reduce the memory footprint of the overall computation.

Figure 4:
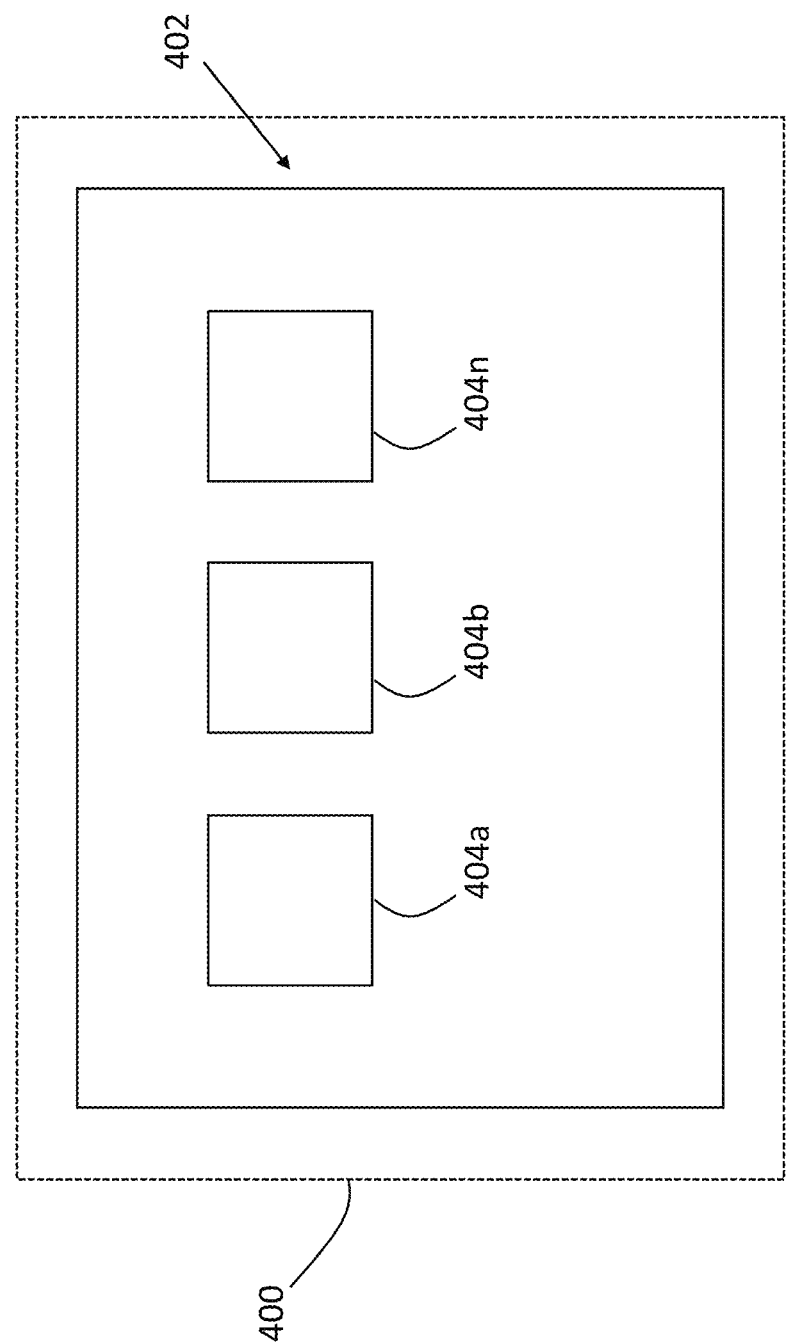
FIG. 4 is a schematic diagram depicting a register file resident on a processor having a plurality of processor registers in accordance with an embodiment of the present invention.

The above process may also be represented in the process flow diagram of FIG. 1, in association with FIGS. 3-4, wherein the process may begin at step 100, and then immediately proceeds to step 102 of providing at least one computer processor 400 resident on an electronic computer device and having at least one register file 402 with a plurality of temporary registers 404*a-n* resident thereon, wherein "n" represents any number greater than one. The register file 402 is resident, housed on, and/or operably connected to at least one computer processor (represented schematically as element 400).

As those of skill in the art will appreciate, a register file is an array of processor registers in a central processing unit (CPU). In one embodiment, the processor registers 404*a-n* are circuit-based register files and may be implemented by way of fast static random-access memories (RAMs) with multiple ports. Such RAMs are distinguished by having dedicated read and write ports, whereas ordinary multi-ported RAMs will usually read and write through the same ports. In other embodiments, the processor registers 404*a-n* may be implemented by way of fast dynamic RAMs. The instruction set architecture of a CPU will almost always define a set of registers which are used to stage data between memory and the functional units on the chip. In simpler CPUs, these architectural registers correspond one-for-one to the entries in a physical register file (PRF) within the CPU. More complicated CPUs use register renaming, so that the mapping of which physical entry stores a particular architectural register changes dynamically during execution.

The process may continue to step 104 of initiating, through the least one computer processor 400, a cryptography session utilizing an $\ell$-degree isogeny arithmetic computation having chained computations therein. The cryptography session may include iteration cycles (wherein the first iteration cycle is represented schematically in FIG. 3 as numeral 300). The process may then proceed to step 106 of carrying out a first iteration cycle, of a plurality of iteration cycles, wherein the first iteration cycle may include sub-steps 106*a-n* (represented with dashed lines in FIG. 1).

More specifically, step 106a may include individually computing a plurality of sequentially occurring pivot points within the chained computations. Step 106b may include implementing a Co—Z algorithm within the plurality of sequentially occurring pivot points to compute a compressed Z value. As discussed above, the process 400 may also be operably configured to implement the Co—Z algorithm alternatively within the plurality of sequentially occurring pivot points to compute the compressed Z value. Step 106c may include storing the compressed Z value generated from the Co—Z algorithm on one of the plurality of temporary registers 404a-n.

Additionally, the compressed Z value generated from the Co—Z algorithm on the one of the plurality of temporary registers 404a-n may be exclusively stored throughout the plurality of the iteration cycles Step 106n may include computing a first $\ell$ isogeny of the $\ell$-degree isogeny arithmetic computations using the compressed Z value. Thereafter, step 108 will include implementing a remaining amount of the plurality of iteration cycles, wherein each of the plurality iteration cycles computing $\ell$ isogenies using the compressed Z value to complete the e-degree isogeny arithmetic computation. The process may terminate in step 110.

It should be emphasized that the optimal strategy is necessary for any implementation of isogeny-based cryptography as it takes much longer (more than 10 times slower for an already slow algorithm). The number of temporary registers, e.g., registers 404a-n, are a result of the pivot points that are needed for the optimal strategy. In one such implementation, we used 6 pivot points. The naive storage of these 6 pivot points is of the form $(X_0, Z_0)$, $(X_1, Z_1) \ldots (X_5, Z_5)$ where the actual point's x-coordinate is equal to $x_i = X_i/Z_i$. We propose to merge each of these $Z_i$ values to a single Z so that the 6 pivot points become $(X_0', Z), (X_1', Z) \ldots (X_5', Z)$. We can transform to this representation with several multiplications: $X_0' = X_0 Z_1 Z_2 Z_3 Z_4 Z_5$, $Z = Z_0 Z_1 Z_2 Z_3 Z_4 Z_5$. It is clear that $x_0 = X_0/Z_0 = X_0'/Z$. This does add several additional field multiplications throughout the large-degree isogeny, which will add 15% additional cycles for the large degree isogeny computation. This further reduces 12 registers held by 6 pivot points to only 7 registers In one exemplary Co—Z algorithmic example, in order to visualize the savings from the above-described process, a side-by-side comparison of the total memory units needed for a large-degree isogeny is depicted in Table 1 (below). In this toy example, only a maximum of three temporary points is stored. The naive method on the left stores all temporary point information requiring a total of 6 temporary registers. The present invention, however, "compresses" the point information by sharing a common denominator to reduce the total memory consumption to 4 registers. As the number of temporary points increases, the memory savings from this approach reaches 50%.

Rather than using two registers per point in storing intermediate information, the present invention would compress the number of registers to one register per point plus an additional register as overhead.

What is claimed is:

1. A computer-implemented cryptography method using isogeny-based computations for reducing a memory footprint comprising the steps of:
providing at least one computer processor resident on an electronic computer device and having at least one register file with a plurality of temporary registers resident thereon; and
initiating, through the least one computer processor, a cryptography session utilizing an $\ell$-degree isogeny arithmetic computation having chained computations therein, wherein the cryptography session includes:
implementing a first iteration cycle, of a plurality of iteration cycles, that includes:
individually computing a plurality of sequentially occurring pivot points within the chained computations;
implementing a Co—Z algorithm within the plurality of sequentially occurring pivot points to compute a compressed Z value;
storing the compressed Z value generated from the Co—Z algorithm on one of the plurality of temporary registers; and
computing a first $\ell$ isogeny of the $\ell$-degree isogeny arithmetic computations using the compressed Z value; and
implementing a remaining amount of the plurality of iteration cycles, each of the plurality iteration cycles computing $\ell$ isogenies using the compressed Z value to complete the $\ell$-degree isogeny arithmetic computation.

2. The method according to claim 1, wherein the first iteration cycle further comprises:
implementing the Co—Z algorithm alternatively within the plurality of sequentially occurring pivot points to compute the compressed Z value.

3. The method according to claim 2, wherein:
the $\ell$-degree isogeny arithmetic computation is carried out with a multiplication-based complexity of O(e log e).

4. The method according to claim 1, wherein the first iteration cycle further comprises:
exclusively storing the compressed Z value generated from the Co—Z algorithm on the one of the plurality of temporary registers throughout the plurality of the iteration cycles.

TABLE 1

| | Naive | | | | | | Patent | | | |
|---|---|---|---|---|---|---|---|---|---|---|
| Operation | $R_0$ | $R_1$ | $R_2$ | $R_3$ | $R_4$ | $R_5$ | $R_0$ | $R_1$ | $R_2$ | $R_3$ |
| Copy input point | $X_0$ | $Z_0$ | | | | | $X_0$ | | | $Z_0$ |
| Store temp point 1 | $X_0$ | $Z_0$ | $X_1$ | $Z_1$ | | | $X_0'$ | $X_1'$ | | $Z_{01}$ |
| Store temp point 2 | $X_0$ | $Z_0$ | $X_1$ | $Z_1$ | $X_2$ | $Z_2$ | $X_0''$ | $X_1''$ | $X_2''$ | $Z_{012}$ |
| Compute isogeny $\varphi$ | $X_0$ | $Z_0$ | $X_1$ | $Z_1$ | $X_2$ | $Z_2$ | $X_0''$ | $X_1''$ | $X_2''$ | $Z_{012}$ |
| Push temp points through isogeny $\varphi$ | $\varphi(X_0)$ | $\varphi(Z_0)$ | $\varphi(X_1)$ | $\varphi(Z_1)$ | $\varphi(X_2)$ | $\varphi(Z_2)$ | $\varphi(X_0)$ | $\varphi(X_1)$ | $\varphi(X_2)$ | $\varphi(Z_{012})$ |
| Use ($\varphi(X2)$, $\varphi(Z2)$)) as next input point | $\varphi(X_0)$ | $\varphi(Z_0)$ | $\varphi(X_1)$ | $\varphi(Z1)$ | | | $\varphi(X_0)$ | $\varphi(X_1)$ | | $\varphi(Z_{012})$ |

5. The method according to claim 1, further comprising:
updating the compressed Z value generated by the Co—Z algorithm for each of the plurality of sequentially occurring pivot points after computing the first $\ell$ isogeny of the $\ell$-degree isogeny arithmetic computations.

6. The method according to claim 5, wherein the first iteration cycle further comprises:
utilizing a single compressed Z value generated by the Co—Z algorithm and stored by the one of the plurality of temporary registers, wherein the Z value is updated sequentially after individually computing a plurality of sequentially occurring pivot points within the chained computations.

7. The method according to claim 6, wherein:
the Z value is updated after computing a first $\ell$ isogeny of the $\ell$-degree isogeny arithmetic computations.

8. The method according to claim 6, wherein:
the compressed Z value, Z, in Co—Z algorithm is at least partially defined by a mathematical formula, $Z=Z \times Z_{tmp}$, wherein $X_k=X_k \times Z_{tmp}$.

9. The method according to claim 8, wherein:
the first $\ell$ isogeny is at least partially defined by a mathematical formula, $X_k=X_k \times Z_{new}$.

10. A computer processing cryptosystem using isogeny-based computations to reduce a memory footprint comprising:
at least one computer processor resident on an electronic computer device and having a register file with at least two temporary registers resident therein, the at least one computer processor operably configured to implement an $\ell$-degree isogeny arithmetic computation, utilizing a Co—Z algorithm, having chained computations that include a plurality of sequentially occurring pivot points, the plurality of sequentially occurring pivot points including the at least one computer processor operably configured to implement the Co—Z algorithm to perform a computation generating a compressed Z value that is operably configured to be stored within one of the at least two temporary registers for computing within the plurality of sequentially occurring pivot points to generate a $\ell$-degree isogeny arithmetic computation isogeny computation output.

11. The computer processing cryptosystem according to claim 10, wherein:
the at least one computer processor is operably configured to implement the Co—Z algorithm over a first iteration cycle of a plurality of iteration cycles, the first iteration cycle including the processor operably configured to compute a first $\ell$ isogeny of the $\ell$-degree isogeny arithmetic computations using the compressed Z value.

12. The computer processing cryptosystem according to claim 11, wherein:
the at least one computer processor is operably configured, after first iteration cycle, to implement a remaining amount of the plurality of iteration cycles, each of the plurality iteration cycles configured to compute another $\ell$ isogeny.

13. The computer processing cryptosystem according to claim 11, wherein the first iteration cycle further comprises:
the at least one computer processor operably configured to implement the Co—Z algorithm alternatively within the plurality of sequentially occurring pivot points to compute the compressed Z value.

14. The computer processing cryptosystem according to claim 11, wherein:
the $\ell$-degree isogeny arithmetic computation is carried out with a multiplication-based complexity of O(e log e).

15. The computer processing cryptosystem according to claim 10, wherein:
the compressed Z value, Z, in Co—Z algorithm is at least partially defined by a mathematical formula, $Z=Z \times Z_{tmp}$, wherein $X_k=X_k \times Z_{tmp}$.

16. The computer processing cryptosystem according to claim 10, wherein:
the first $\ell$ isogeny is at least partially defined by a mathematical formula, $X_k=X_k \times Z_{new}$.

* * * * *